United States Patent
Doy

(10) Patent No.: US 11,026,035 B1
(45) Date of Patent: Jun. 1, 2021

(54) TRANSDUCER ELECTRICAL CHARACTERISTIC AND STATE SENSING USING MULTIPLE VOICE COILS

(71) Applicant: CIRRUS LOGIC INTERNATIONAL SEMICONDUCTOR, LTD., Edinburgh (GB)

(72) Inventor: Anthony S. Doy, Los Gatos, CA (US)

(73) Assignee: CIRRUS LOGIC, INC., Austin, TX (US)

( * ) Notice: Subject to any disclaimer, the term of this patent is extended or adjusted under 35 U.S.C. 154(b) by 0 days.

(21) Appl. No.: 16/850,184

(22) Filed: Apr. 16, 2020

Related U.S. Application Data

(60) Provisional application No. 62/836,097, filed on Apr. 19, 2019.

(51) Int. Cl.
*H04R 29/00* (2006.01)
*H04R 9/02* (2006.01)
(Continued)

(52) U.S. Cl.
CPC .......... *H04R 29/003* (2013.01); *G06F 3/016* (2013.01); *H04R 3/007* (2013.01); *H04R 3/04* (2013.01); *H04R 9/025* (2013.01); *H04R 9/046* (2013.01); *H04R 9/063* (2013.01); *H04R 9/18* (2013.01); *H04R 2209/041* (2013.01); *H04R 2400/03* (2013.01)

(58) Field of Classification Search
CPC ........ H04R 29/003; H04R 3/007; H04R 3/04; H04R 9/025; H04R 9/046; H04R 9/063; H04R 9/18; H04R 2209/041; H04R 2400/03; G06F 3/016
See application file for complete search history.

(56) References Cited

U.S. PATENT DOCUMENTS 6,535,058 B1   3/2003   Kim
8,284,928 B2   10/2012  Bailey
(Continued)

OTHER PUBLICATIONS

Toverland, John, "Thermal modelling of voice coils in microspeakers", Master's Thesis, Linköping, University, May 2016. Linkoping, SE.
(Continued)

*Primary Examiner* — Mark Fischer
(74) *Attorney, Agent, or Firm* — Mitch Harris, Atty at Law, LLC; Andrew M. Harris

(57) ABSTRACT

An audio output system for energizing a multiple voice coil transducer supplies at least two power output signals to the voice coils, a pilot tone generator for generating a pilot tone signal, and a power output circuit. The power output circuit generates power output signals from the pilot tone and the input signal so that the voice coils respond to the input signal with an in-phase electro-mechanical relationship and respond to the pilot tone with an out-of-phase (motion canceling) electro-mechanical relationship, reducing the effect of the pilot town on mechanical movement of the voice coil. A sensing circuit senses electrical signal values at terminals of the at least two voice coils, and a processing circuit detects a response of the output transducer to the pilot tone and determines at least one operating characteristic of the output transducer from the electrical signal values.

21 Claims, 7 Drawing Sheets

(51) Int. Cl.
*H04R 9/06* (2006.01)
*H04R 3/00* (2006.01)
*G06F 3/01* (2006.01)
*H04R 9/04* (2006.01)
*H04R 9/18* (2006.01)
*H04R 3/04* (2006.01)

(56) References Cited

U.S. PATENT DOCUMENTS

| | | |
|---|---|---|
| 8,598,957 B2 | 12/2013 | Lee et al. |
| 9,232,305 B2 | 1/2016 | French et al. |
| 9,578,416 B2 | 2/2017 | Gautama |
| 9,628,928 B2 | 4/2017 | Yasuda et al. |
| 9,674,593 B2 | 6/2017 | Gautama et al. |
| 9,807,528 B1 * | 10/2017 | Jensen .................. H04R 3/007 |
| 2016/0127833 A1 * | 5/2016 | Yasuda ................ H04R 29/003 |
| | | 381/59 |

OTHER PUBLICATIONS

Klippel R&D, "Application Note AN-29: Loudspeaker Limits and Protection Systems", Apr. 4, 2012. Dresden, DE.
Office Action in U.S. Appl. No. 16/829,286 dated Feb. 24, 2021.

\* cited by examiner

TRANSDUCER ELECTRICAL CHARACTERISTIC AND STATE SENSING USING MULTIPLE VOICE COILS

The present Application Claims priority under 35 U.S.C. § 119(e) to U.S. Provisional Patent Application 62/836,097 filed on Apr. 23, 2019, the disclosure of which is incorporated herein by reference.

BACKGROUND

1. Field of Disclosure

The field of representative embodiments of this disclosure relates to methods, circuits and systems that sense characteristics and/or states of a transducer having multiple voice coils.

2. Background

Voice coil-based acoustic output transducers, such as loudspeakers that may be connected to a wide range of amplification systems, and micro speakers that may be included in personal devices, headphones, earbuds or other devices such as hearing aids, typically contain a single voice coil that is energized by an amplifier or pulse-width modulator output. The voice coil moves due to an electromotive force provided between the voice coil and a permanent magnetic field provided by a magnet. Other types of acoustic output transducers, known as field coil speakers, operate similarly, but have a magnetic field provided by a second, "field coil" that surrounds the voice coil.

Multiple voice coil speakers are available that allow adjustment of speaker impedance to provide optimum power transfer from an amplifier by either connecting a pair of voice coils in parallel or series to change the impedance presented to the amplifier. The pairs of voice coils may be overlapped on the voice coil form, or the voice coils may be distributed along on the length of the voice coil former. Other systems allow summing of multiple amplifier outputs by providing pairs of independent voice coils, so that the amplifier outputs are not electrically connected, but both contribute to the electromotive force generated by the electromagnetic interaction of the voice coil and the magnetic field of the speaker. The amplified signals provided to the pair of voice coils are typically generated from a common audio input signal by a pair of amplifiers and are typically identical in voltage. Less commonly, a speaker will have a segmented voice coil, in which the voice coils do not overlap, but are typically electrically connected to form one or more "taps".

Speakers and other transducers that use moving coils, such as haptic feedback transducers, vary in characteristics due to manufacturing variation and environmental variation, in particular with temperature, which not only affects the resistance of a voice coil, but may also affect the strength of the magnetic field produced by permanent magnets. Since the impedance of the transducer varies with temperature, in order to provide a proper transducer drive signal and protect the transducer windings from over-current failure, it is desirable to be able to determine the voice coil resistance and/or temperature of the transducer during operation. It is also desirable to be able to determine the characteristics of such a transducer generally, as transducers may be interchangeably connected to an amplifier or other power output stage, and to overcome variations in manufacture in more permanent connections. Other status information, such as the instantaneous position of the voice coil and the instantaneous AC electrical characteristics is also desirable for controlling the operation of the output stage driving the transducer.

Existing solutions for determining speaker conditions and characteristics inject a low amplitude and low frequency "pilot tone" that enables determination of the impedance of the speaker at the pilot tone frequency by measuring a voltage and a current at the speaker terminals. Given the known & stable correlation of voice coil resistance change with respect to temperature, the actual voice coil operating temperature can be inferred. However, addition of a sub-audible pilot tone at levels required to make accurate measurements adds excursion to the voice coil, limiting the excursion available for reproducing the transducer's acoustic output. Pilot tones at higher frequencies would become audible and typically unacceptable for that reason.

Therefore, it would be advantageous to sense characteristics and states of transducers, in particular during operation of the transducers, while not significantly reducing the available excursion and not generating audible artifacts.

SUMMARY

Improved determination of transducer status and characteristics operation of multiple voice coil transducer systems may be accomplished in amplifier/signal processing systems and amplifier circuits and their methods of operation.

The methods, systems and circuits supply at least two power output signals for energizing at least two voice coils of an output transducer, a pilot tone generator for generating a pilot tone signal, and a power output circuit that generates power output signals from the pilot tone and the input signal so that the voice coils respond to the input signal with an in-phase electro-mechanical relationship and respond to the pilot tone with an out-of-phase electro-mechanical relationship. A sensing circuit senses electrical signal values at terminals of the at least two voice coils, and a processing circuit detects a response of the output transducer to the pilot tone and determines at least one operating characteristic of the output transducer from the electrical signal values.

The method, systems and circuits may determine a DC resistance, temperature, position. AC impedance or other characteristic that may be determined and computed from the measured electrical signal values. The output transducer may be a micro speaker, loudspeaker, or another acoustic output device. The output transducer may also be a haptic feedback device, or other electromechanical device that uses voice coils to produce movement. The voice coils may be electrically separate, or continuous with one or more taps. The voice coils may be concentrically wrapped, or be displaced along a voice coil form.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure encompasses methods, systems and circuits that determine electrical characteristics and states of voice-coil based transducers having multiple voice coils, such as speakers and haptic feedback devices, and may determine or infer other state information such as voice coil temperature or voice coil position from the electrical characteristics. The techniques inject a pilot tone into multiple voice coils of the transducer in an out-of-phase relationship with respect to the mechanical movement of the voice coil, so that mechanical movement due to the pilot tone is minimized. The output signals provided to the transducer are introduced in an in-phase relationship to cause the desired mechanical movement and consequent acoustic output. The voice coils may be concentric voice coils that are wrapped together, or may be linearly displaced along a voice coil form along the axis of movement of the voice coils. The voice coils may be electrically separate, or may be a continuous voice coil with one or more "taps". The voice coils may be the voice coils of a speaker formed on a voice coil form and attached to a cone, or the voice coils may be the motive coils of a haptic device such as a linear resonant actuator (LRA) or the winding of a motorized haptic device such as an eccentric rotating mass (ERM) device.

Figure 1A:
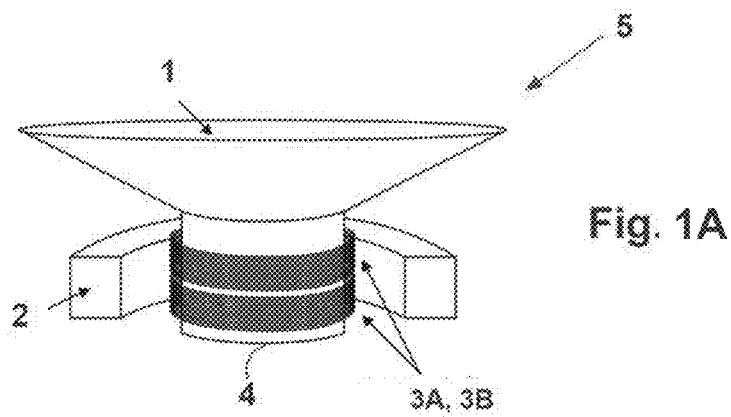
FIGS. 1A-1D are illustrations of speakers with a segmented voice coil arrangement as may be employed in the systems of FIG. 2B, FIG. 3A, FIG. 3B and FIG. 4.
Figure 1B:
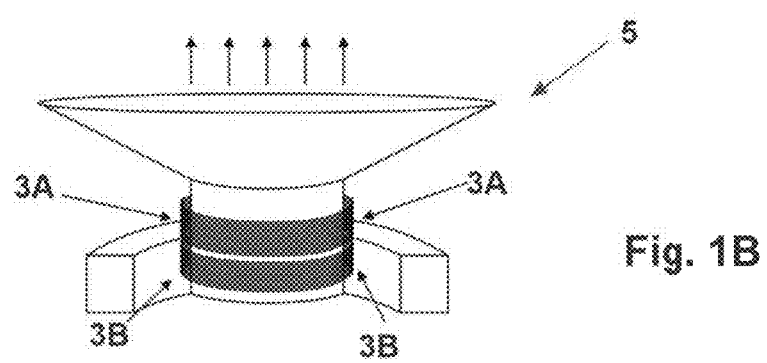
Figure 1C:
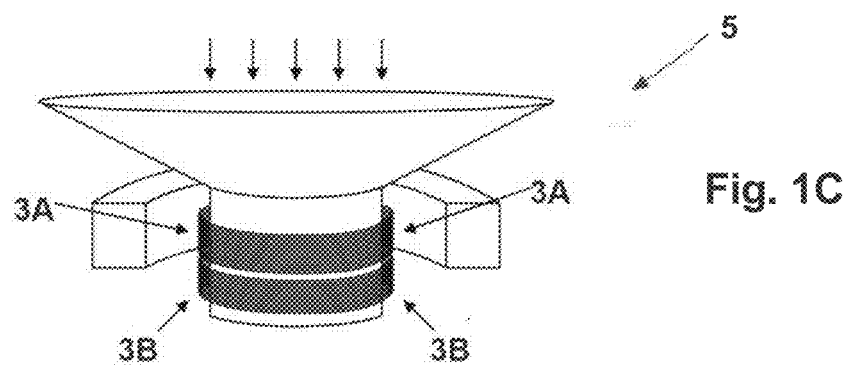

Referring now to FIG. 1A, an example of a dual-voice coil speaker 5 is shown. Speaker 5 is a permanent magnet type speaker with a ring magnet 2 shown cut-away to reveal a pair of segmented voice coils 3A, 3B in a neutral (non-energized) position. Voice coils 3A, 3B are wound on a form 4 that is attached to a cone 1 of speaker 5, which extends outward as shown in FIG. 1B when energized by positive current(s), by convention. and retracts inward as shown in FIG. 1C when energized by negative current(s), by convention. While the DC resistance of voice coils 3A, 3B does not vary with position of voice coil form 4, the AC impedance and the interaction of voice coils 3A, 3B does vary with position, which is one cause of non-linearity in the electromotive transfer function of speaker 5, which is exacerbated at high signal levels. When form 4, which determines the position of the voice coil assembly including voice coils 3A,3B, moves outward due to a positive current signal, voice coil 3A moves from the central volume inside of ring magnet 2. Thus, the current in voice coil 3A is interacting with a weaker magnetic field as the outward displacement of form 4 increases as illustrated in FIG. 1B. Therefore, increasingly more current is needed to move form 4 and therefore cone 1 outward by the same increment of the positive displacement and thus the electro-mechanical behavior becomes non-linear. Similarly, when form 4 moves inward due to a negative current signal, voice coil 3B moves from the central volume inside of ring magnet 2, and thus the current in voice coil 3B is interacting with a weaker magnetic field and behaves non-linearly as the outward displacement of form 4 increases, as illustrated in FIG. 1C. U.S. patent application Ser. No. 16/829,286 filed on Mar. 25, 2020, and entitled "CURRENT VECTORING TO ELECTROACOUSTIC OUTPUT TRANSDUCERS HAVING MULTIPLE VOICE COILS" is incorporated herein by reference in its entirety. The above-incorporated U.S. patent application describes techniques for compensating for non-linearity using voice coil position information, which may be obtained from measurements such as the techniques described and claimed herein.

Figure 1D:
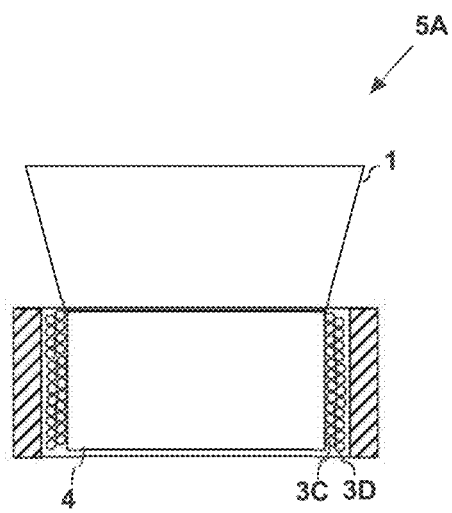

Referring now to FIG. 1D, another example of a dual-voice coil speaker 5A is shown. Speaker 5A is also permanent magnet type speaker, but has concentrically wrapped windings 3C and 3D. Such speakers are used to provide flexibility in impedance matching by connecting windings 3C and 3D either in a parallel or a series arrangement and are also sometimes used to combine the outputs of two separate amplifiers, for example in dual bridged configurations where there is no common return terminal. Because windings 3C and 3D are co-located along the axis of form 4, sensing of speaker position is not carried out as for speaker 5 of FIGS. 1A-1C, but impedance and temperature may be measured while suppressing movement due to the pilot tone, by supplying the pilot tone in opposite phases across windings 3C and 3D. All of the voice coil arrangements of the speakers described in FIGS. 1A-1D may alternatively represent motive coils or windings of haptic devices and the circuits and techniques described below may be applied to such devices as well as speakers.

Figure 2A:
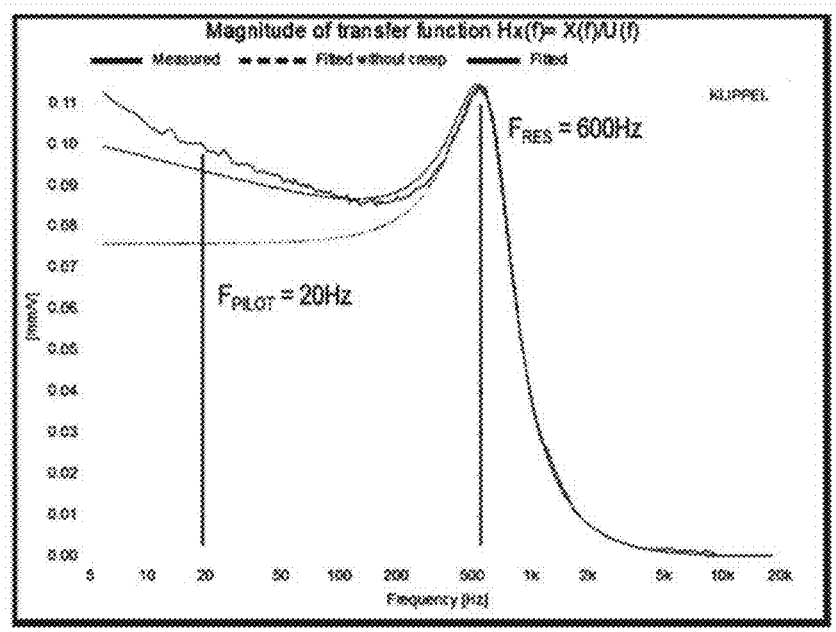
FIG. 2A is a graph depicting a frequency response of a segmented voice coil speaker, illustrating potential selection of pilot tone frequency in systems according to embodiments of the disclosure.

Referring to FIG. 2A, a graph shows a frequency-dependent electromechanical transfer response of a micro speaker having a resonant frequency of approximately 600 Hz in a controlled-leakage enclosure. A pilot tone frequency of 20 Hz is shown on the graph, which represents injection of a 20 Hz sine wave or a discrete stepped-voltage approximation. While a pilot tone of 20 Hz would generally not be audible, it is apparent from the graph that significant excursion would still occur, as the electromechanical transfer function actually increases with decreasing frequency below 100 Hz. Therefore, if a typical pilot tone approach is used, then the amplitude required to obtain an accurate measurement in the presence of other signals and noise will also cause low-frequency excursion of cone 1 (FIGS. 1A-1C) that will reduce the amount of excursion range available from speaker 5 that could otherwise be used to reproduce audible signals. The same principle holds true for non-audio devices such as haptic feedback devices, for which producing high amplitude signals is generally critical. Other frequencies below the resonant frequency, or above the resonant frequency and in the audible range may be used, if the pilot tone leakage, i.e., an audible portion of the pilot tone that is produced by the transducer due to lack of cancelation between the voice coils, is low enough in amplitude. For example, a pilot tone frequency of 150 Hz, which is below the resonant frequency in the graph of FIG. 2A will produce less of an electromechanical response if the voice coils are mis-matched, or if cancelation degrades, Degradation of the cancelation may occur due to voice coil excursion reducing the electromechanical transfer function of one voice coil versus the other, as the voice coils move into or out of the strongest portion of the magnetic field of the speaker magnet.

Figure 2B:
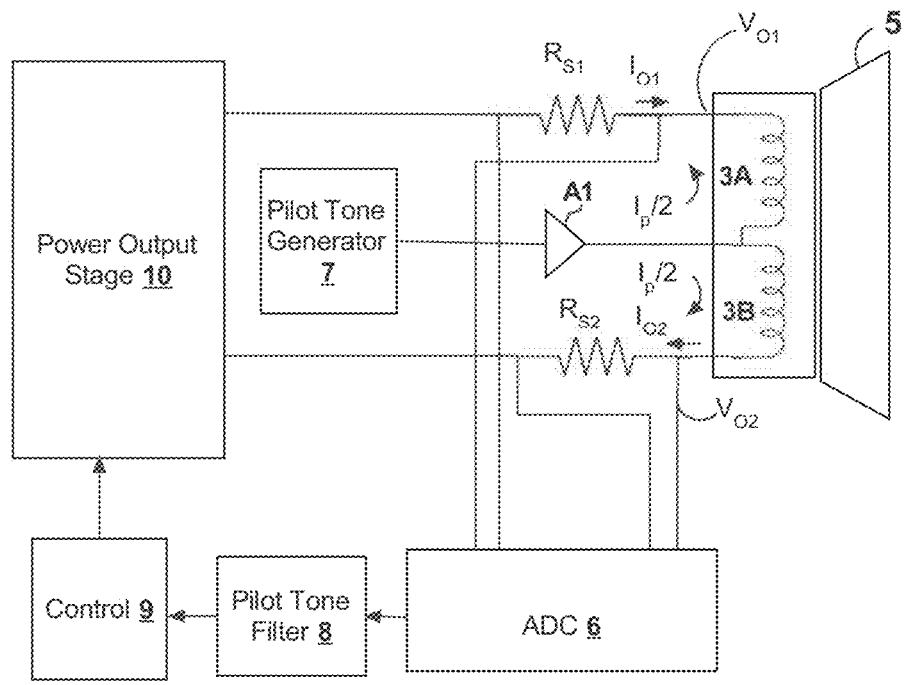
FIG. 2B is a block diagram of a system including a segmented voice coil speaker, according to an embodiment of the disclosure.

While the following descriptions are generally with reference to a circuit block diagram, it is understood that the description and the calculations included therein are applicable to a processes that may be implemented at least in part by a digital signal processor executing a computer program product according to an embodiment of the disclosure as described in further detail below. Referring to FIG. 2B, a system that determines characteristics and/or states of speaker 5 (or speaker 5A of FIG. 1D). Voice coils 3A and 3B of speaker 5 are supplied with output voltage and current from power output stage 10, in the form of audio power output signals. A pilot tone generator 7 generates a pilot tone, e.g., a 20 Hz sine wave as described above, and an amplifier A1 provides a power output stage for the pilot tone and generates a signal that is introduced to the common connection of voice coils 3A and 3B. The signal has an amplitude $V_{pilot}$ that produces a current $I_p$ that is split at speaker 5, so that currents $I_{p1}$, $I_{p2}$ at the pilot tone frequency are caused to pass through voice coils 3A and 3B in opposite phase, which cancels motion that would otherwise be caused by either of the individual currents $I_{p1}$ or $I_{p2}$. The currents provided from power output stage 10 are introduced in the same phase, due to the series connection of voice coils 3A and 3B. An analog-to-digital converter (ADC) 6 receives input voltages from both terminals of sense resistors $R_{S1}$ and $R_{S2}$, which provide a measure of the currents $I_{O1}$ and $I_{O2}$ flowing through voice coils 3A and 3B, respectively. Sense resistors $R_{S1}$ and $R_{S2}$ generally have a very low resistance value, e.g., 0.1 Ohm, in order to avoid introducing significant output power loss. The same inputs to ADC 6 that are connected to the common terminals between sense resistors $R_{S1}$ and $R_{S2}$ and voice coils 3A and 3B, respectively, are used to measure the voltage $V_{O1}$-$V_{O2}$ introduced across the series connection of voice coils 3A and 3B. Knowing voltage $V_{O1}$-$V_{O2}$ and currents $I_{O1}$ and $I_{O2}$, the impedance of speaker 5 may be determined by a control block 9 after their pilot tone component has been extracted by filtering the output of ADC 6 by pilot tone filter 8, which may include separate filters for the voltages and currents, or may be time-multiplexed. In an alternative embodiment, measuring voltages $V_{O1}$, $V_{O2}$ is not required for determining the amplitude of the output signals provided to speaker 5, since that amplitude may be known from the input conditions and any gain of power output stage 10. Although in the depicted embodiment voltages $V_{O1}$, $V_{O1}$ are used for measuring the output currents provided to voice coils 3A and 3B, a pilot tone current provided to one or both voice coils may be measured by measuring the current output by amplifier A1. Pilot tone current $I_P$ split between voice coils 3A and 3B, so that $I_{O1}+I_P/2=I_{O2}-I_P/2$, the real part of the voltage/current ratio for the pilot tone is the DC resistance of speaker 5:

$$\text{Re}[(V_{O1}-V_{O2})/(IO_1-I_{O2})]=\text{Re}(V_{O1}-V_{O2})/I_P=R_{SPKR}$$

and since the resistance of metal wire is generally linear with temperature, $R_{SPKR}$ may be used to determine the temperature of voice coils 3A and 3B as:

$$R_{SPKR}=k(T-T_0)+R_0$$

Therefore $$T=(R_{SPKR}-R_0)/k+T_0,$$

where $T_0$ is a temperature value at which $R_0$ is a known resistance of voice coils 3A and 3B, e.g., 25° C., and k is the temperature coefficient of resistivity for the material from which voice coils 3A and 3B are formed, e.g., 0.00386Ω/° C. for copper wire. Control block 9 may invoke speaker protection when temperature T exceeds a predetermined limit, by disabling power output stage 10 until temperature T falls below another predetermined value. If the imaginary part of the impedance of speaker 5 is determined, by knowing the input voltage phase or by measuring at different frequencies, the inductive part of the speaker impedance may be determined, which enables inference of voice coil position and determination of other parameters of speaker 5, if for example, the resonant frequency and/or other mechanical parameters 5 are known.

Figure 3A:
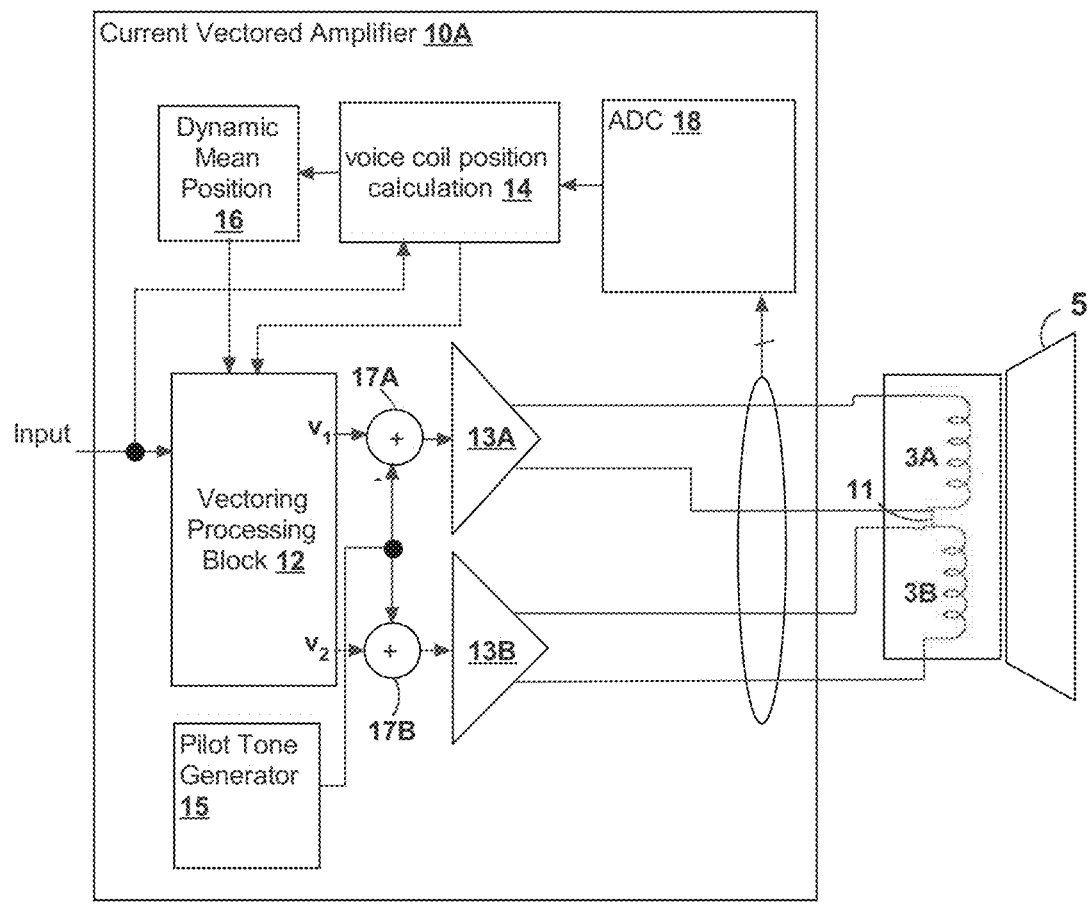
FIG. 3A is a block diagram of a system including a segmented voice coil speaker, according to an embodiment of the disclosure.

As mentioned above, when the voice coils of a speaker or other device, such as a haptic feedback device, are displaced along the axis of movement of the voice coils, the position of the voice coils with respect to the magnetic field of the speaker or other device may be determined from the terminal voltage and current at the pilot tone frequency. The above-incorporated U.S. patent application Ser. No. 16/829,286 shows an example of determining voice coil position and controlling the current provided to two or more voice coil segments or two or more voice coils according to the determined position, i.e., the displacement of the voice coils mentioned above. Referring to FIG. 3A, an amplification system in the form of a current vectored amplifier circuit 10A is shown. Voice coils 3A and 3B of speaker 5 are supplied with output voltage and current from amplifiers 13A and 13B, respectively. The sum of the voltages is the same, regardless of the instantaneous vectoring ratio, so the circuit may be viewed as a standard amplifier channel providing a voltage to a single voice coil speaker, but injecting an additional current through the common terminal to shift the voltage of the common terminal with respect to the other terminals of the voice coil, which shifts the amount of current supplied to each of the voice coils. A connection 11 is shown optionally connecting voice coils 3A and 3B in series, representing a segmented (tapped) voice coil. A vectoring processing block 12 receives an input signal Input which is generally in the form of discrete samples of program material to be reproduced if vectoring processing block 12 is a digital signal processor, which is generally the case, although the disclosure is not limited to digital signal processors and an analog circuit could be adapted to perform some or all of the functions detailed herein. Further, it may not be necessary to use a general-purpose digital signal processor to implement vectoring processing block 12, as look-up tables may be used to perform some or all of the transformations needed to produce vectored input signals v1, v2 that are provided to the inputs of a pair of combiners 17A, 17B that subtract and add, respectively the output of a pilot tone generator 15 to signals provided to the inputs of amplifiers 13A and 13B, respectively. In contrast to the system of FIG. 2B, current-vectored amplifier 10A adds a pilot tone voltage to the output signals provided to voice coils 3A, 3B, which enables the same measurements to be made by an analog-to-digital converter (ADC) 18 as in the system of FIG. 2B. Vectoring processing block 12 generates vectored input signals v1, v2 from input signal Input and an indication of the position of the voice coil assembly of speaker 5, i.e., the position of form 4 with respect to the neutral position received from a voice coil position calculation block 14. The position of the voice coil assembly may be determined via channels of ADC 18 that measure the voltages at the outputs of amplifiers 13A and 13B and the voice coil currents. The voice coil currents may be determined by measurement techniques such as voltage sensing across a series resistor as illustrated in the system of FIG. 2B, current mirroring in the output stages of amplifiers 13A and 13B or other known current-sensing techniques. Alternatively, if the characteristics of speaker 5 are well known, the position of the voice coil assembly may be predicted from the history and instantaneous value of input signal Input using the Thiele/Small parameter model. A dynamic mean position (DMP) calculation block 16 determines the DMP from the indication of voice coil assembly position generated by voice coil position calculation block 14.

Figure 3B:
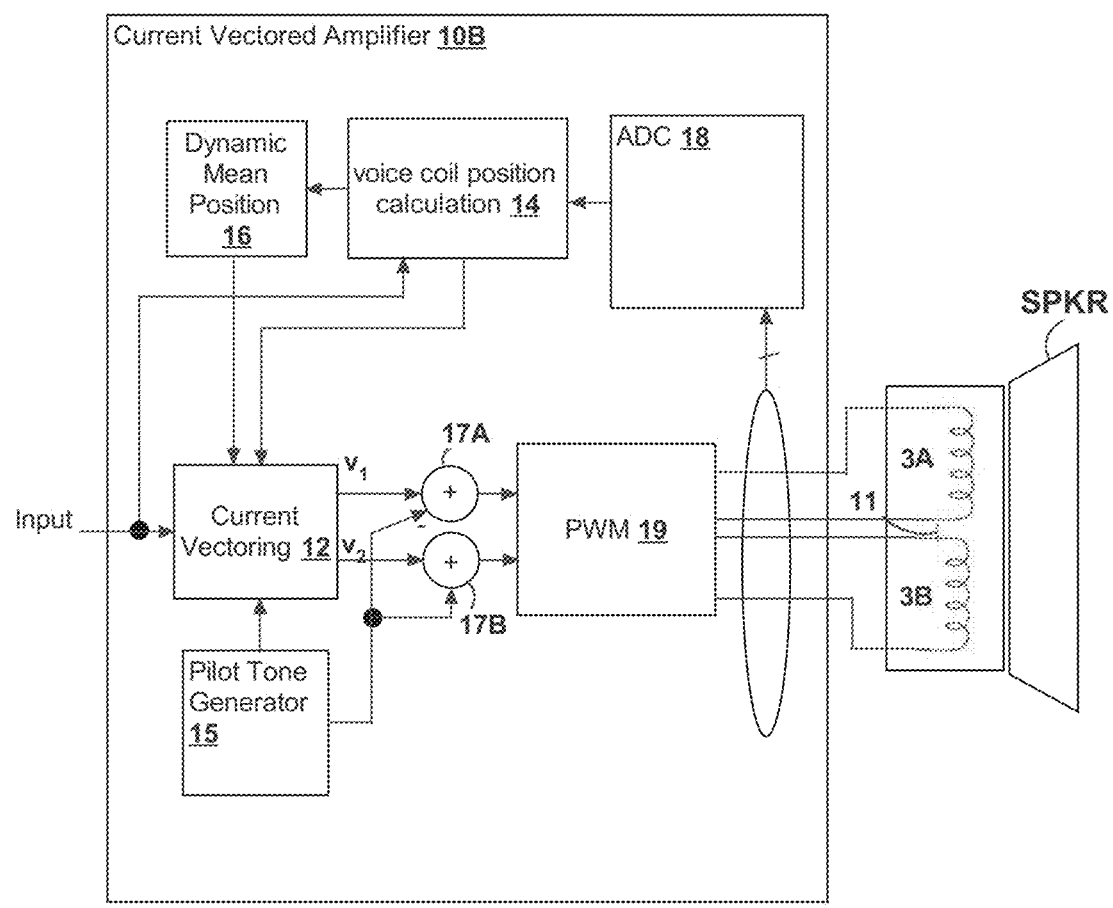
FIG. 3B is a block diagram of another system including a segmented voice coil speaker, according to another embodiment of the disclosure.

Referring now to FIG. 3B, another amplification system is shown in the form of a current vectored amplifier 10B connected to voice coils 3A and 3B of speaker 5. Current vectored amplifier 10B is similar to current vectored amplifier 10A of FIG. 3A, so only differences between them are described below. Instead of analog amplifiers, current vectored amplifier 10B uses a pulse width modulator (PWM) having sufficient channels to supply current pulses to the terminals of voice coils 3A and 3B, which may require only three outputs if voice coils 3A and 3B are connected in series, i.e., connection 11 is present, or may require four outputs if voice coils 3A and 3B are isolated. Filtering may be needed at the input channels to ADC 18, in order to obtain the resultant pilot tone voltage and current waveforms reliably.

Figure 4:
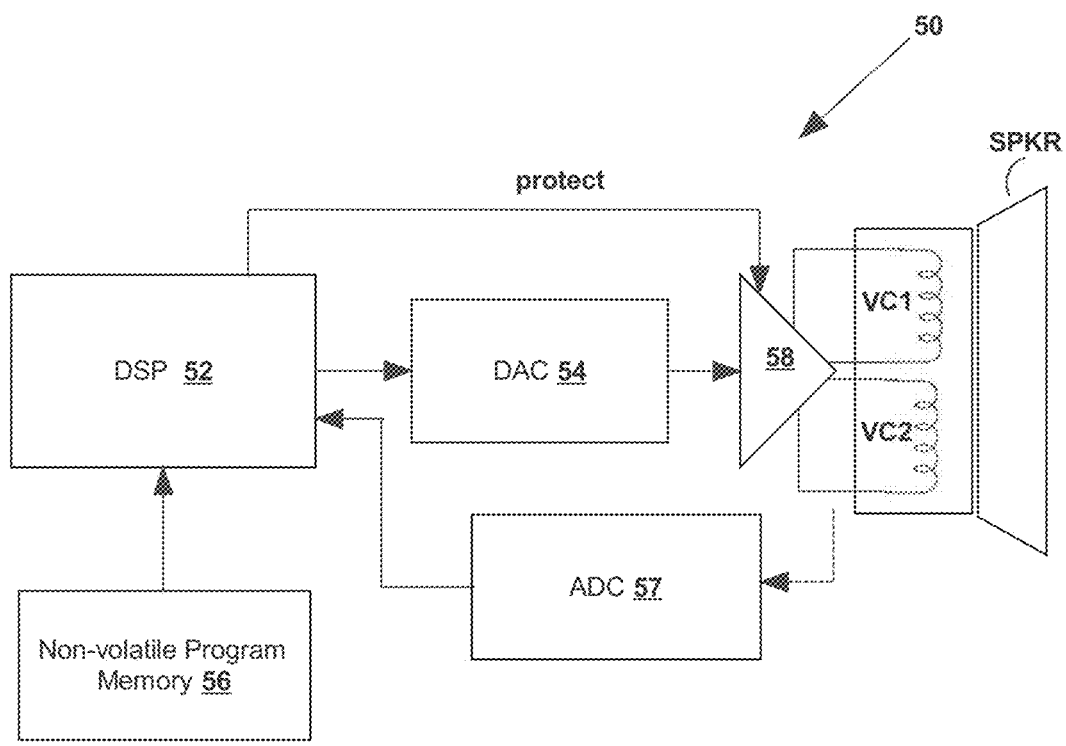
FIG. 4 is a block diagram of a digital signal processing system in which techniques according to an embodiment of the present disclosure are practiced.

Referring now to FIG. 4, a digital signal processing system is shown, which may be used to implement the techniques of the present disclosure. A digital signal processor (DSP) 52 (or a suitable general-purpose processor) executes program instructions stored in a non-volatile memory 56 and that form a computer-program product in accordance with the present disclosure. DSP 52 receives samples of a signal at an Input and samples of voice coil voltage and current sensing from an ADC 57. A digital-to-analog converter 54 receives output values corresponding to the amplifier output signals including the pilot tone in the appropriate phases and provides analog output signals to an amplifier block 58 that provides the drive signals to voice coils VC1 and VC2. DSP 52 also provides a protection signal protect that is used to disable amplifier 58 when the calculated temperature of voice coils VC1 and VC2 exceeds a predetermined limit.

Figure 5A:
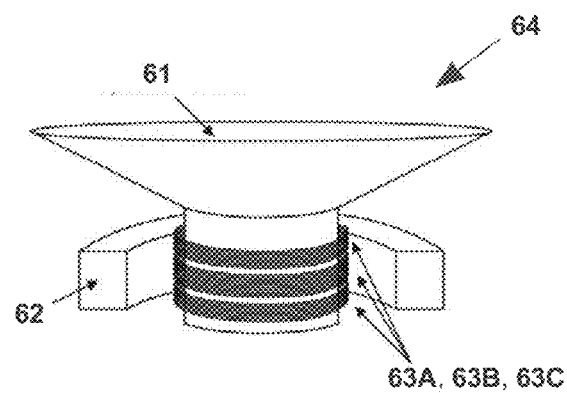
FIG. 5A is an illustration of a speaker with a segmented voice coil arrangement having three voice coils.
Figure 5B:
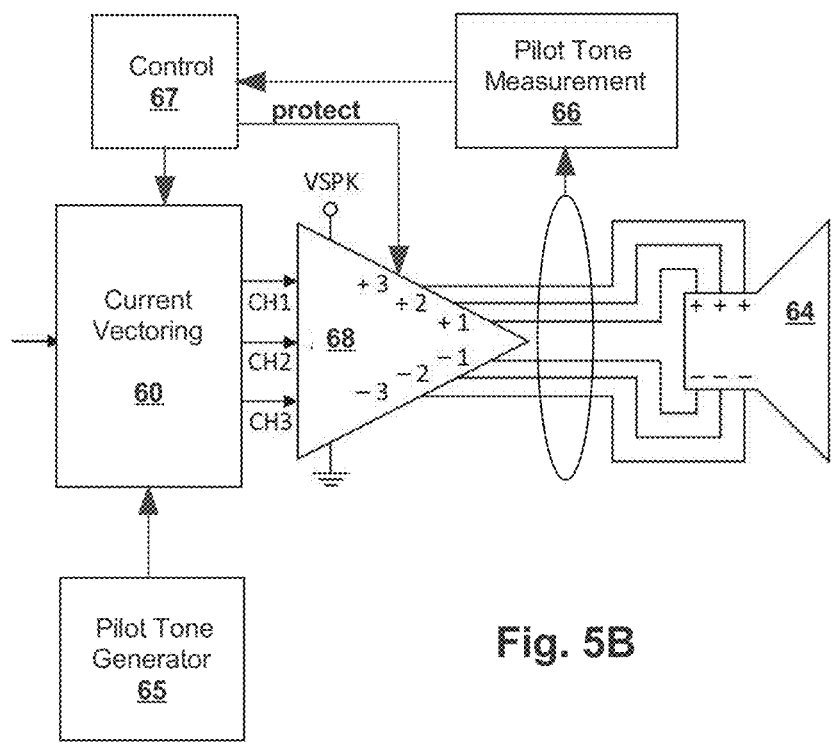
FIG. 5B is an electrical block diagram of a system that may be used to supply power to the speaker of FIG. 5A.

Referring now to FIG. 5A, a triple voice coil speaker 64 is shown, which may also be driven by circuits and systems according to the disclosure above, except that the pilot tone may be provided to three voice coils 63A, 63B and 63C instead of two. Alternatively, if at least two of voice coils 63A, 63B and 63C are matched in electromechanical transfer, then the pilot tone may be injected through those two voice coils in an out-of-phase relationship so that the mechanical excursion due to the pilot tone is substantially canceled. Otherwise, a symmetric phase relationship of 0, 120 and 240 degrees of phase will result in a substantially net-zero excursion due to the pilot tone, provided a matching electromechanical transfer of voice coils 63A, 63B and 63C. The three voice coils 63A, 63B and 63C are mechanically connected to a cone 61 of speaker 64 and move within a magnetic field generated by a permanent ring magnet 62. Any number of segments of a voice coil, or number of separate voice coil windings may be driven in a vectored manner, with a resulting increase of complexity and number of voice coil signal outputs. FIG. 5B shows a system for supplying signals to speaker 64 include an amplifier 68 with six voice coil signal outputs and a current vectoring processor 60. A control block 67 receives pilot tone measurement information from a pilot tone measurement block 66 and generates protection signal protect, which enables and disables amplifier 68 when the temperature of voice coils 63A, 63B and 63C is excessive. Control block 67 also supplies voice coil position information to current vectoring processor 60, which vectors current to voice coils 63A, 63B and 63C according to the techniques described above and in above-incorporated U.S. patent application "CURRENT VECTORING TO ELECTROACOUSTIC OUTPUT TRANSDUCERS HAVING MULTIPLE VOICE COILS."

As mentioned above portions or all of the disclosed process may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions. These computer readable program instructions may also be stored in other storage forms as mentioned above and may be downloaded into a non-volatile memory for execution therefrom. However, the collection of instructions stored on media other than the non-volatile memory described above also form a computer program product that is an article of manufacture including instructions which implement aspects of the functions/actions specified in the block diagram block or blocks.

In summary, this disclosure shows and describes circuits and methods that supply at least two power output signals to at least two voice coils of an output transducer. The circuits and methods receive an input signal, generate a pilot tone signal and generate the power output signals from the pilot tone and the input signal such that the voice coils respond to the input signal with an in-phase electro-mechanical relationship between the voice coils and respond to the pilot tone with an out-of-phase motion-canceling electro-mechanical relationship between the voice coils. The circuits and methods sense one or more electrical signal values at terminals of the voice coils, detect a response of the output transducer to the pilot tone and determine at least one operating characteristic of the output transducer.

The sensing circuit may sense a pilot tone current through at least one of the voice coils, and a processing circuit may determine a resistance of the voice coil(s) from the pilot tone current and a pilot tone voltage across the voice coil(s). The sensing circuit may further sense the pilot tone voltage as a voltage across the voice coil(s). The processing circuit may determine a temperature of the voice coil(s) from the determined resistance and a predetermined thermal characteristic of a conductor of the voice coil(s). The voice coils may be concentrically wrapped voice coils that are not significantly displaced along their axis of motion, or the voice coils may be displaced along an axis of motion of the voice coils. The output transducer may be a speaker, or may be a haptic feedback device. The pilot tone may approximate a sine wave having a sub-audible frequency or an audible frequency less than a resonant frequency of the speaker.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied in large-scale high-power outdoor systems to monitor potential problems with environmental temperature rise in combination with temperature rise due to operation.

What is claimed is:

1. A circuit for supplying at least two power output signals for energizing at least two voice coils of an output transducer, comprising:
    an input for receiving an input signal;
    a pilot tone generator for generating a pilot tone signal;
    at least one power output circuit for generating the at least two power output signals from the pilot tone and the input signal such that the at least two voice coils respond to the input signal with an in-phase electro-mechanical relationship between the at least two voice coils and respond to the pilot tone with an out-of-phase motion-canceling electro-mechanical relationship between the at least two voice coils;
    a sensing circuit for sensing one or more electrical signal values at terminals of the at least two voice coils; and
    a processing circuit coupled to the sensing circuit, wherein the processing circuit detects a response of the output transducer to the pilot tone and determines at least one operating characteristic of the output transducer.

2. The circuit of claim 1, wherein the sensing circuit senses a pilot tone current through the at least one of the at least two voice coils, and wherein the processing circuit determines a resistance of the at least one of the at least two voice coils from the pilot tone current and a pilot tone voltage across the at least one of the at least two voice coils.

3. The circuit of claim 2, wherein the sensing circuit senses the pilot tone voltage as a voltage across the at least one of the at least two voice coils.

4. The circuit of claim 2, wherein the processing circuit determines a temperature of the at least one of the at least two different voice coils from the determined resistance and a predetermined thermal characteristic of a conductor of the at least one of the at least two different voice coils.

5. The circuit of claim 1, wherein the at least two voice coils are concentrically wrapped voice coils that are not significantly displaced along an axis of motion of the voice coils.

6. The circuit of claim 1, wherein the at least two voice coils are voice coils that are displaced along an axis of motion of the voice coils.

7. The circuit of claim 1, wherein the output transducer is a speaker.

8. The circuit of claim 1, wherein the pilot tone approximates a sine wave having a sub-audible frequency.

9. The circuit of claim 1, wherein the pilot tone approximates an audible frequency less than a first resonant frequency of the speaker.

10. The circuit of claim 1, wherein the output transducer is a haptic feedback device.

11. A circuit for supplying at least two power output signals for energizing at least two voice coils of a speaker, comprising:
    an input for receiving an input signal;
    a pilot tone generator for generating a pilot tone signal that is a sine wave at a sub-audible frequency;
    a power output circuit for generating the at least two power output signals from the pilot tone and the input signal such that the at least two voice coils respond to the input signal with an in-phase electro-mechanical relationship between the at least two voice coils and respond to the pilot tone with an out-of-phase motion-canceling electro-mechanical relationship between the at least two voice coils;
    a sensing circuit for sensing a pilot tone current through each of the voice coils; and
    a processing circuit coupled to the sensing circuit, wherein the processing circuit detects a response of the output transducer to the pilot tone and determines a resistance of the voice coils and from the determined resistance determines a temperature of the voice coils and a predetermined thermal characteristic of a conductor of the at least one of the at least two different voice coils.

12. A method of determining a characteristic of an output transducer, having at least two voice coils, the method comprising:
    supplying at least two power output signals for energizing at least two voice coils of an output transducer, comprising:
    receiving an input signal;
    generating a pilot tone signal;
    generating the at least two power output signals from the pilot tone and the input signal such that the at least two voice coils respond to the input signal with an in-phase electro-mechanical relationship between the at least two voice coils and respond to the pilot tone with an out-of-phase motion-canceling electro-mechanical relationship between the at least two voice coils;
    sensing one or more electrical signal values at terminals of the at least two voice coils; and
    detecting a response of the output transducer to the pilot tone; and
    determining at least one operating characteristic of the output transducer.

13. The method of claim 12, wherein the sensing one or more electrical signal values senses a pilot tone current through the at least one of the at least two voice coils, and wherein the determining at least one operating characteristic determines a resistance of the at least one of the at least two voice coils from the pilot tone current and a pilot tone voltage across the at least one of the at least two voice coils.

14. The method of claim 13, wherein the sensing one or more electrical signal values senses the pilot tone voltage as a voltage across the at least one of the at least two voice coils.

15. The method of claim 13, further comprising determining a temperature of the at least one of the at least two different voice coils from the determined resistance and a predetermined thermal characteristic of a conductor of the at least one of the at least two different voice coils.

16. The method of claim 12, wherein the at least two voice coils are concentrically wrapped voice coils that are not significantly displaced along an axis of motion of the voice coils.

17. The method of claim 12, wherein the at least two voice coils are voice coils that are displaced along an axis of motion of the voice coils.

18. The method of claim 12, wherein the output transducer is a speaker.

19. The method of claim 12, wherein the pilot tone approximates a sine wave having a sub-audible frequency.

20. The method of claim 12, wherein the pilot tone approximates an audible frequency less than a first resonant frequency of the speaker.

21. The method of claim 12, wherein the output transducer is a haptic feedback device.

* * * * *

UNITED STATES PATENT AND TRADEMARK OFFICE
CERTIFICATE OF CORRECTION

PATENT NO. : 11,026,035 B1
APPLICATION NO. : 16/850184
DATED : June 1, 2021
INVENTOR(S) : Anthony S. Doy Page 1 of 1

It is certified that error appears in the above-identified patent and that said Letters Patent is hereby corrected as shown below:

In the Specification

In Column 3, Line 22, delete "DESCRIPTION" and insert -- DETAILED DESCRIPTION --, therefor.

In Column 3, Line 22, delete "convention. and" and insert -- convention, and --, therefor.

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*